United States Patent [19]

Deitz et al.

[11] 4,016,242

[45] Apr. 5, 1977

[54] SALTS OF THE IODINE OXYACIDS IN THE IMPREGNATION OF ADSORBENT CHARCOAL FOR TRAPPING RADIOACTIVE METHYLIODIDE

[75] Inventors: Victor R. Deitz, Chevy Chase; Charles H. Blachly, West Hyattsville, both of Md.

[73] Assignee: The United States of America as represented by the United States Energy Research and Development Administration, Washington, D.C.

[22] Filed: Feb. 26, 1976

[21] Appl. No.: 661,572

[52] U.S. Cl. .............................. 423/240; 423/245; 55/71; 55/74; 176/37; 252/438; 252/441; 252/444; 252/301.1 W
[51] Int. Cl.² ......................................... B01D 53/34
[58] Field of Search ................. 423/240, 241, 245; 55/71, 74; 252/441, 444, 43 F, 301.1 W; 176/37

[56] References Cited

UNITED STATES PATENTS

| 3,453,807 | 7/1969 | Taylor | 55/71 |
| 3,838,554 | 10/1974 | Wilhelm et al. | 55/71 |

OTHER PUBLICATIONS

B570,925, Mar., 1976, Dietz et al., 55/71.

*Primary Examiner*—Earl C. Thomas
*Attorney, Agent, or Firm*—Dean E. Carlson; Joseph J. Natoli

[57] ABSTRACT

Radioactive iodine and radioactive methyliodide can be more than 99.7 per cent removed from the air stream of a nuclear reactor by passing the air stream through a 2-inch thick filter which is made up of impregnated charcoal prepared by contacting the charcoal with a solution containing KOH, iodine or an iodide, and an oxyacid, followed by contacting with a solution containing a tertiary amine.

3 Claims, No Drawings

SALTS OF THE IODINE OXYACIDS IN THE IMPREGNATION OF ADSORBENT CHARCOAL FOR TRAPPING RADIOACTIVE METHYLIODIDE

BACKGROUND OF THE INVENTION

It is essential in nuclear power reactor operations to remove the radioiodine fission-product and the organic derivatives that are present in the reactor air cleaning systems. This is done by passing the air stream through filters containing adsorbent charcoal which is suitably impregnated with compounds capable of removing both elementary iodine and the organic iodide. The charcoal must remain at high efficiency during its long service time, often when confronted with adverse contaminants in the air.

Two types of chemical reactions have been used in beds of impregnated charcoals for the removal of radioactive iodine and radioactive methyliodide from air streams. One type employs impregnating solutions containing iodine. The removal of radioactive iodine and radioactive methyliodide is considered to be based upon a dissociation-controlled exchange, i.e. the exchange is controlled by dissociation of one of the species. For example,

$$CH_3I^{131} + I^{127} - (\text{on charcoal}) \rightarrow CH_3I^{127} + I^{131} - (\text{on charcoal})$$

The other type of impregnation entails an association-controlled exchange. The reactants form a labile association complex, the stability of which varies for different systems. An example is the reaction between a tertiary organic amine such as triethylenediamine and radioactive methyliodide.

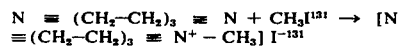

$$N \equiv (CH_2-CH_2)_3 \equiv N + CH_3I^{131} \rightarrow [N \equiv (CH_2-CH_2)_3 \equiv N^+ - CH_3] \; I^{-131}$$

DESCRIPTION OF THE INVENTION

This invention relates to the use of mixtures in water of a salt of iodine oxyacids with an iodide and/or free iodine, as impregnating solutions for charcoals. The water solution of the mixture is made basic by addition of an inorganic base. The mixtures react to form hypoiodites that can take part via the above mechanism in exchange with radioactive methyliodide. This solution is added to the charcoal, followed by a second solution containing a tertiary amine.

Preferably, the alkali salts of the iodine oxyacids, for example, KIO (potassium hypoiodite), $KIO_3$ (potassium iodate), $KIO_4$ (potassium periodate) are used together with an alkali iodide, such as KI (potassium iodide) and/or elementary iodine $I_2$. Although hypoiodites are not particularly stable compounds, the hypoiodite group which is formed in the above mixture was found to be stable when adsorbed on charcoals, especially when absorbed from solutions of pH 10 and above.

In accordance with the invention, this stable hypoiodite group is capable of entering into exchange with radioactive methyliodide. The hypoiodite group forms from a redistribution among the iodine components of the mixture. That is, the hypoiodite species is formed and even resupplied on standing or after exchange as a result of the iodine in this solution being distributed among the following charges: $I^-$, $I^0$, $I^{+1}$, $I^{+5}$, $I^{+7}$. This occurs in the mixture as one of the reactant species is chemically oxidized and the second species is chemically reduced, forming an equilibrium mixture with different charges on the iodine.

An advantage of the present invention is in the choice of one of several specified chemical operations that yields hypoiodite reactive species in the impregnating solution and, also in the use of a two-step process of impregnation constituting contact of charcoal with the reactive mixture followed by contact with a tertiary amine.

The two-step process of impregnation results in the minimum penetration of radioactive methyliodide through the charcoal bed. An example is the use of $KIO_3$ + KI (or $I_2$) + KOH (to form the hypoiodite species) as the first step of impregnation and hexamethylenetetramine (HMTA) as a second step of impregnation. In this example, the total iodine was maintained at between 0.5 to 4 gram/100 grams of charcoal; KOH was added to form a clear solution at pH ~ 10. The amine was maintained at 5 gram/100 grams of charcoal. The solutions in droplet form in pressured air were directed into a slowly rotating bed of charcoal in a cylinder equipped with inclined lifts. The results shown in Table 1 are for independent impregnations using a coal-base charcoal. Table 1 shows figures which show a penetration well within the regulatory requirements set forth in Regulatory Guide 1.52 published by the Nuclear Regulatory Commission. The requirements call for passage of less than 5 percent of radioactive methyliodide through a 2-inch test bed.

Table 1

| Sample | Impregnant for 100 g charcoal | | % Penetration |
|---|---|---|---|
| | Step 1 | Step 2 | |
| 4250 | $KIO_3$, KI, KOH | HMTA, 1g | 0.26 |
| 4251 | $KIO_3$, $I_2$, KOH | HMTA, 2g | 0.47 |
| 4254 | $KIO_3$, KI, KOH | HMTA, 1g | 0.54 |
| 4260 | $KIO_3$, KI, KOH | HMTA, 2g | 0.30 |
| 4264 | $KIO_3$, KI, KOH | HMTA, 2g | 0.36 |
| 4266 | $KIO_3$, KI, KOH | HMTA, 2g | 0.50 |
| 4267 | $KIO_3$, KI, KOH | HMTA, 2g | 0.25 |
| 4268 | $KIO_3$, $I_2$, KOH | HMTA, 2g | 0.38 |
| 4269 | $KIO_3$, $I_2$, KOH | HMTA, 2g | 0.16 |
| 4271 | $KIO_3$, $I_2$, KOH | HMTA, 2g | 0.43 |
| 4272 | $KIO_3$, $I_2$, KOH | HMTA, 2g | 0.22 |
| 4273 | $KIO_3$, $I_2$, KOH | HMTA, 2g | 0.18 |

Penetration of radioactive methyliodide through a coal-base charcoal

Test Conditions: Bed diameter 2-inch; height 2-inch; contact time 0.26 seconds; prehumidification 18 hrs. at 96 RH A series of impregnations were made with the source of the iodine in the following binary mixtures: $KIO_3$ and KI, $KIO_3$ and $I_2$, $KIO_4$ and KI, $KIO_4$ and $I_2$. A two-step impregnation was made on the coal-base charcoal; the total iodine was again maintained at between 0.5 and 4 wt.% of the charcoal. The first step of the impregnation was with one of the above mixtures and the second step was with 1 percent HMTA by weight of charcoal. To show the contribution of the tertiary amine in this invention the impregnation was repeated without the HMTA. The results are given in Table 2. The tertiary amine participates by way of an addition reaction in the removal of radioactive methyliodide as opposed to exchange of radioactive methyliodide with the hypoiodite species.

Table 2

Impregnation with binary mixtures of iodate or periodate with iodide or iodine

| Sample | Step 1 | Step 2 | % Penetration |
|---|---|---|---|
| 4250 | $KIO_3$ and KI | 1% HMTA | 0.26 |
| 4251 | $KIO_3$ and $I_2$ | 1% HMTA | 0.47 |
| 4252 | $KIO_4$ and KI | 1% HMTA | 0.18 |
| 4253 | $KIO_4$ and $I_2$ | 1% HMTA | 0.54 |
| 4254 | $KIO_3$ and KI | none | 0.54 |
| 4255 | $KIO_3$ and $I_2$ | none | 0.56 |
| 4256 | $KIO_4$ and KI | none | 0.44 |
| 4257 | $KIO_4$ and $I_2$ | none | 0.51 |

Test Conditions: 2-inch diameter; 2-inch height; contact time 0.25 seconds; prehumidification 18 hrs. at 96 RH The iodine in all of the iodine containing compounds has been varied from a total of 0.5 to a total of 4 wt.% of the charcoal; about 2 percent appears to be optimum. The tertiary amine was varied from 1 to 5 wt.% of the charcoal, the source of the charcoal being an important factor in establishment the optimum amount to use.

The high flash point amines such as HMTA do make significant contributions to a successful formulation with respect to high temperature desorption, to an elevation in the ignition temperature, and to the prevention of iodine leakage in the event of decomposition at some elevated temperature before ignition is reached. Examples of the high flash point amines which can be used in this invention are hexamethylenetetramine, triethyanolamine, N-methylmorpholine, N, N, N',N'-tetramethylethylenediamine, 1, dimethylamino-2-propanol, N-methylpiperazine, N, N, N',N'-tetramethyl-1,4-butanediamine, 1,2-bis(trialkylamonium)ethane, N, N, N', N'-tetramethylmethanediamine, 1,2-bis(morphalino)ethane, 1,2-bis-(dialkamino)ethane and 1,3-bis(dialkylamino)propane.

Effective trapping of radioactive methyliodide can be achieved by using for step 1 a water mixture of KI + $I_2$ + KOH inasmuch as the hypoiodite group can also be formed in this mixture, but a greater amount of this reactive species will be generated by adding the oxyacid initially to the solution made up for step 1.

EXAMPLE

One hundred grams of coal-base charcoal, dried at 100° C was impregnated in sequence with the following two solutions: Solution 1 was made up of 1.29 grams of $KIO_3$ (potassium iodate), 1.00 grams of elementary $I_2$, 0.06 grams of KOH and 25 ml. of water. Solution 2 contained 5 grams of HMTA in 25 ml. of water. Solution 1 was injected as a fine spray into the rotating bed of charcoal and followed immediately by injection of the second solution as a fine spray. This operation was followed by a fine spray of 20 ml. of water. The bed of charcoal was continued to be rotated for 20 minutes. The product was free-flowing with no apparent film of liquid. The product was then dried in an open air oven at 95° C overnight. This dried product was placed in a filter 2 inches in diameter and 2 inches in height and prehumidified with air at 96% RH (relative humidity) at a flow of 25 liters per minute. (This step was performed to conform with stringent regulatory test procedures to have the charcoal perform under extreme adverse humidity conditions.) After humidification, 5.49 mg. of radioactive methyliodide was injected into the air stream at intervals of 2 hours, and the flow of air continued for 2 hours. (The passage of this amount of radioactive methyliodide, 5.49 mg., constitutes a very large amount of radioactive contaminant from a nuclear reactor, and is an amount recommended by the Nuclear Regulatory Commission for testing the suitability of filters for recovery of this type of contaminant.) The test charcoal, and the additional charcoal in the back-up beds were then counted for radioactivity, and the penetration calculated. The penetration in the test charcoal was found to be 0.30 percent. While the Example is limited to HMTA, other high flash point tertiary amines can be used.

What is claimed is:

1. The method of removing methyliodide[131] gas from the effluent of reactor comprising passing said effluent gas through a charcoal sorbent formed by first contacting charcoal with an aqueous mixture of a first component comprising a salt of the iodine oxyacids selected from the group consisting of periodate, iodate and hypoiodite and a second component selected from the groups consisting of iodine and iodide salt, the aqueous mixture being adjusted to a pH of about 10, and then contacting the resulting impregnated charcoal with a tertiary amine.

2. The method of claim 1 wherein the concentration of compounds selected is in an amount that will result in the total weight of iodine in the charcoal constituting between 0.5 to 4 percent weight of the impregnated charcoal.

3. The method of claim 1 where the tertiary amine is selected from the group of compounds consisting of hexamethylenetetramine, triethyanolamine, N-methylmorpholine, N, N, N', N'-tetramethylethylene-diamine, 1, dimethylamino-2-propanol, N-methylpiperazine, N, N, N', N'-tetramethyl-1,4-butanediamine, 1,2-bis(trialkylamonium)ethane, N, N, N', N'-tetramethylmethanediamine, 1,2-bis(morpalino)ethane, 1,2-bis(-dialkamino)ethane and 1,3-bis(dialkylamino)propane.

* * * * *